United States Patent [19]

Bertin

[11] 4,167,981

[45] Sep. 18, 1979

[54] SEALS PARTICULARLY FOR ROTATING SHAFTS

[75] Inventor: Jacques Bertin, Asnieres, France

[73] Assignee: Paulstra, France

[21] Appl. No.: 879,602

[22] Filed: Feb. 21, 1978

[30] Foreign Application Priority Data

Feb. 23, 1977 [FR] France ............................ 77 05270

[51] Int. Cl.² .............................................. F16J 15/32
[52] U.S. Cl. .................................................. 277/152
[58] Field of Search ............................... 277/152, 153

[56] References Cited

U.S. PATENT DOCUMENTS

| 2,736,585 | 2/1956 | Riesing ................................. 277/153 |
| 3,516,679 | 6/1970 | Schmitt ................................. 277/153 |

FOREIGN PATENT DOCUMENTS

| 2458773 | 10/1975 | Fed. Rep. of Germany .......... 277/153 |
| 1038905 | 5/1953 | France .................................... 277/153 |

*Primary Examiner*—Robert I. Smith
*Attorney, Agent, or Firm*—Larson, Taylor and Hinds

[57] ABSTRACT

The invention concerns seals particularly for rotating shafts.

This seal, with a flexible membrane in the form of a cupola having an aperture for the shaft to pass therethrough, is characterized by the fact that said cupola has a thickness decreasing from its base to the contact ridge with the shaft, the elasticity necessary for maintaining the contact being obtained from the inherent rigidity of the membrane.

5 Claims, 1 Drawing Figure

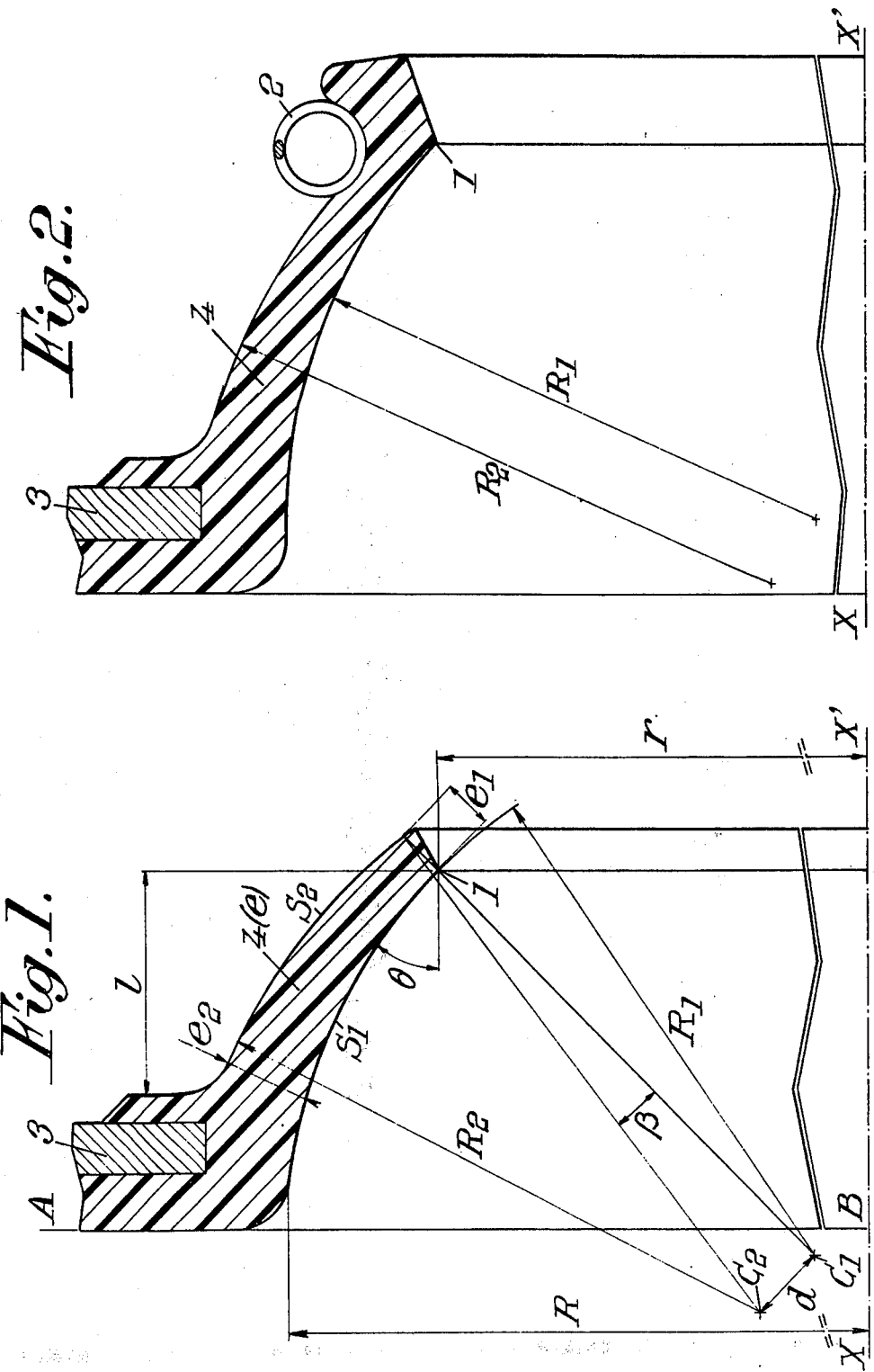

SEALS PARTICULARLY FOR ROTATING SHAFTS

The invention relates to seals, particularly for rotating shafts, of the kind characterised principally by the fact that each seal in question comprises essentially a flexible membrane, particularly made of rubber, reinforced at its base by a frame, and having the general shape of a part of a cupola, with a substantially continuous inner profile, culminating in a ridge for contacting the shaft, e.g. at an angle of incidence of about 35° to 45°.

In the constructions provided up to present, to ensure or complete the pressure between said ridge and the shaft, a spiral spring has been used bearing on a contact lip bordering the cupola.

The present invention has as its aim to provide the seal so that the pressure is maintained, between the seal and the shaft, by the very properties of the elastic material used and without requiring use of a spring (although the presence of such a spring, in certain cases, is not excluded).

For this purpose, in accordance with the invention, while still maintaining for the seals of the kind in question the general shape of a cupola apertured, in the region of its apex, for the shaft to pass through, this cupola formed from a plastic material has a continuously decreasing thickness from its base to the contact ridge with the shaft, the whole ensuring furthermore a suitable angle of incidence with regard to said ridge.

It has in particular been noticed that such seals could ensure a very good seal, even without a spring, while maintaining however along the contact ridge the desired pressure, without this latter suffering a significant decrease, because of the expansion caused by the impregnation with oil and the temperature increase during operation.

To construct said seals it will be advantageous to use silicone, a material worthy of consideration because it gives rise only to small permanent deformation, but whose expansion could become too great under the effect of the two above-mentioned factors (impregnation with oil and temperature increase). The adoption of a meniscus shape, with a steadily decreasing thickness in the direction of the contact ridge, counterbalances the effects of these two factors and so maintains in these silicone seals, the expansion at a low value, thus avoiding a considerable pressure drop at the contact ridge.

The law of variation of the thickness of the membrane is determined by experience, depending on the qualities of the elastic material used. The ratio of decrease will be, for example, 2 to 1.

That will lead to arranging the bordering surfaces of the cupola or meniscus forming the membrane, inside and outside, in the form of spherical or toric surfaces, whose radii of curvature $R_1$ and $R_2$, respectively for the inside and the outside, will be little different, the centres of curvature being moreover at some distance from each other. More complex surfaces could moreover possibly be chosen, with variable radius of curvature, the constructions shown hereafter with constant radii of curvature seeming the most simple.

The invention comprises, apart from the arrangements which precede, certain other arrangements which are used preferably at the same time and which will be more explicitly discussed hereafter.

It relates more particularly to certain modes of application (particularly for seals cooperating with rotating shafts), as well as certain embodiments of said arrangements; and it relates, more particularly still and this as novel industrial products, to seals of the kind in question with application of these same arrangements, as well as the special elements for their construction and the units, particularly engines, comprising them.

It will, in any case, be well understood with the help of the complement of description which follows as well as the accompanying drawing, which complement and drawing are, of course, given especially by way of indication FIGS. 1 and 2 of this drawing show in partial axial section, according to two different embodiments, a seal for a rotating shaft, constructed in accordance with the invention.

According to the invention, and more especially according to those of the embodiments of its different parts to which it seems preference should be given, proposing to construct for example a seal for a rotating shaft, e.g. a seal fixed in relation to the shaft (it being understood that the invention would apply likewise to a rotating seal), the following or similar is the way to set about it.

This seal is formed essentially by an elastomer membrane 4, strengthened at its base at 3, this membrane assuming a general cupola shape, apertured at its apex along a ridge 1 for the shaft to pass therethrough, shown here solely by its axis X—X', the whole being calculated so as to provide, along said ridge 1, a contact pressure under the effect of the elasticity of the material. In other words, with a seal having an opening with an edge of diameter 2r, there is made to coact therewith a shaft having a diameter greater than 2r.

Membrane 4 (FIGS. 1 and 2) is then given a thickness of a value steadily decreasing from base $e_2$ to the contact ridge forming sealing lip 1 ($e_1$) as in a meniscus, the ratio $e_2/e_1$ being for example of the order of 2 to 1.

It is advisable to construct the seal from a silicone type material, which presents small permanent deformation with at the same time an advantageous elastic characteristic, with good "pick-up."

It is however advisable that the contact pressure at 1 is not influenced too much by the impregnation of the material by the lubricant, during operation, nor by the increases of temperature, these two factors contributing to causing an expansion of the whole, therefore a decrease of said pressure at 1.

From this latter point of view, the variable thickness membrane, with a thickness increasing from lip 1, will help to avoid or limit said expansion.

But it is also advantageous:
  to adopt, for the minimum value $e_1$, a suitable value, in proportion to the other parameters,
  and to limit as much as possible height 1 of the cupola above its base 3.

Two embodiments of the invention are given below.

In the example of FIG. 1, it is assumed that the membrane in the shape of a cupola 4, having at its base, in the plane AB and before mounting on the ridge, an opening with a diameter 2R and, at its apex, an opening of diameter 2r, is defined by toric surfaces $S_1 S_2$ generated for example by parts of circles of different diameters $R_1 R_2$ and with centres $C_1 C_2$ separated by a distance d from each other, the different parameters having approximately the following values:
  R=41 mm
  r=38 mm
  $R_1$=12 mm $R_2 = 13$ mm
$d = 1.9$ mm
$e_1 = 1.3$ mm
$e_2 = 2.1$ mm Height 1 above the reinforced base 3 is itself of the order of 4 mm. Angle $\theta$ at the contact ridge, in relation to the axis of the seal, is of the order of 45°, whereas angle $\beta$ of the tangents to surfaces $S_1$ $S_2$ with regard to ridge 1, is of the order of 10°.

Such a seal, provided for sealing a shaft whose diameter is a little greater than 2r, for example 80 mm, gives every satisfaction, the loss of clamping in use not exceeding 30%.

In each case, the dimension figures for the whole will be determined for the best, the essential thing being to obtain, by progressive reduction of thickness $e_2$ $e_1$ towards the contact ridge, the desired rigidity.

For seals meant for shafts having a relatively small diameter, it seems that the above-mentioned parameters must have values in the following ranges:

$0.4 \leqq e_1 \leqq 3.5$ mm $3 \leqq R_1 \leqq 15$ mm $4 \leqq R_2 \leqq 20$ mm $35 \leqq \theta \leqq 40°$ $0 \leqq \beta < 20°$ The axial length 1 could be between 2 and 10 mm, although higher values are in no way excluded.

These figures, in any case, are only purely indicative and, in particular, nothing would prevent seals being formed with different dimensions for shafts having larger or smaller diameters.

If need be, in certain applications, a spring 2 could nevertheless be provided, as shown in FIG. 2, while still keeping for the membrane of the seal the above-mentioned shape.

Following which, whatever embodiment is adopted, the invention provides the possibility of constructing seals whose operation is sufficiently clear from what has gone before for it to be pointless insisting thereon and which present, in relation to those of the kind in question already existing, numerous advantages, particularly:

that of a great "pick-up", owing to the possibility of using silicone, so of avoiding having to use a spring, if need be, and that, however, of reducing the effects of the expansion (due to the action of the fluid to be sealed and the temperature), and this owing to the particular shape of the seals.

As is evident, and as it follows moreover already from what has gone before, the invention is in no wise limited to those of its modes of application and embodiments which have been more especially discussed; it embraces, on the contrary, all variations thereof.

I claim:

1. A sealing joint with a flexible membrane having the shape of a truncated cupola and including an enlarged base portion having a stiffener member therein which is integral with the assembly that supports the joint, said membrane defining a smaller opening at the end opposite said enlarged portion which, in use, engages a shaft in relative rotation to ensure sealing therebetween, said membrane being constituted by a wall defined by inner and outer toric surfaces, said inner and outer surfaces being concave in the direction towards the longitudinal axis of the sealing joint and the wall defined by said surfaces having a thickness which uniformly decreases towards the smaller opening of the sealing joint, said smaller opening terminating in a bevel defining an inner edge for ensuring tight contact with the shaft that is to be sealed, said sealing joint being fabricated of silicone.

2. A sealing joint according to claim 1 wherein the ratio of the thickness of the wall at said enlarged portion to that at smaller opening is of the order of 2 to 1.

3. A sealing joint according to claim 1 wherein the inner and outer surfaces of the wall have curvilinear sections with different radii of curvature.

4. A sealing joint to claim 1 wherein the inner and outer surfaces of the wall have circular sections, with similar or slightly different radii of curvature.

5. A sealing joint according to claim 1 wherein the radii of curvature of the inner and outer surfaces of the cupola have closely spaced centers and lie close to the axis of the joint.

* * * * *